(12) United States Patent
Frank

(10) Patent No.: US 11,389,794 B2
(45) Date of Patent: Jul. 19, 2022

(54) METHOD FOR PROVIDING A SOLUTION OF THE SUBSTANCE IN A MICROFLUIDIC DEVICE

(71) Applicant: Robert Bosch GmbH, Stuttgart (DE)

(72) Inventor: Tino Frank, Lucerne (CH)

(73) Assignee: Robert Bosch GmbH, Stuttgart (DE)

( * ) Notice: Subject to any disclaimer, the term of this patent is extended or adjusted under 35 U.S.C. 154(b) by 191 days.

(21) Appl. No.: 16/961,813

(22) PCT Filed: Dec. 20, 2018

(86) PCT No.: PCT/EP2018/086162
§ 371 (c)(1),
(2) Date: Jul. 13, 2020

(87) PCT Pub. No.: WO2019/137783
PCT Pub. Date: Jul. 18, 2019

(65) Prior Publication Data
US 2021/0069699 A1 Mar. 11, 2021

(30) Foreign Application Priority Data
Jan. 15, 2018 (DE) ...................... 10 2018 200 520.6

(51) Int. Cl.
*B01L 3/00* (2006.01)

(52) U.S. Cl.
CPC ..... *B01L 3/50273* (2013.01); *B01L 2200/027* (2013.01)

(58) Field of Classification Search
CPC ....... B01L 2200/027; B01L 2200/0684; B01L 2200/16; B01L 2300/0609;
(Continued)

(56) References Cited

U.S. PATENT DOCUMENTS

| 4,207,450 A | 6/1980 | Mittleman |
| 4,624,133 A | 11/1986 | Iwashita |

(Continued)

FOREIGN PATENT DOCUMENTS

| CN | 2567580 Y | 8/2003 |
| CN | 1946473 A | 4/2007 |

(Continued)

OTHER PUBLICATIONS

Wang Y. et al., "Study of a Novel Microfluidic DNA Extraction Chip," Nanoelectric Device & Technology, Sep. 2007, pp. 853-856 and 867.

(Continued)

*Primary Examiner* — Jennifer Wecker
*Assistant Examiner* — Jonathan Bortoli
(74) *Attorney, Agent, or Firm* — Maginot, Moore & Beck LLP

(57) ABSTRACT

A method for providing a solution of a substance in a microfluidic device includes providing a dispersion of a first medium and of a lyophilizate of the substance, the lyophilizate being insoluble in the first medium, and adding a second medium to the dispersion, the lyophilizate being soluble in the second medium. The method further includes dissolving the lyophilizate in the second medium such that the solution of the substance in the second medium is obtained, and separating the solution obtained by the dissolving of the lyophilizate from the first medium.

11 Claims, 14 Drawing Sheets

(58) Field of Classification Search
CPC ..... B01L 2300/0867; B01L 2400/0481; B01L 3/50273; B01L 3/502738; B01L 3/502769; G01N 2035/1034; G01N 35/10
See application file for complete search history.

(56) References Cited

U.S. PATENT DOCUMENTS

| | | | |
|---|---|---|---|
| 5,186,817 | A | 2/1993 | Paspek et al. |
| 6,548,071 | B1 * | 4/2003 | Cherian ............. A61K 31/4745 424/484 |
| 7,449,342 | B2 | 11/2008 | Kane et al. |
| 9,551,667 | B2 | 1/2017 | Schmidt et al. |
| 2007/0212708 | A1 * | 9/2007 | Gumbrecht ............. B01F 33/30 435/6.19 |
| 2008/0153152 | A1 | 6/2008 | Wakabayashi et al. |
| 2011/0194105 | A1 | 8/2011 | LaFrancois et al. |
| 2015/0292000 | A1 | 10/2015 | Grosshauser et al. |
| 2016/0045843 | A1 | 2/2016 | Stone et al. |
| 2016/0175432 | A1 | 6/2016 | Ma et al. |
| 2016/0251698 | A1 | 9/2016 | Laermer et al. |

FOREIGN PATENT DOCUMENTS

| | | |
|---|---|---|
| CN | 1950520 A | 4/2007 |
| CN | 1950522 A | 4/2007 |
| CN | 101706484 A | 5/2010 |
| CN | 101737989 A | 6/2010 |
| CN | 103025431 A | 4/2013 |
| CN | 103184143 A | 7/2013 |
| CN | 103562729 A | 2/2014 |
| CN | 103733059 A | 4/2014 |
| CN | 103849548 A | 6/2014 |
| CN | 104053774 A | 9/2014 |
| CN | 104136123 A | 11/2014 |
| CN | 104276539 A | 1/2015 |
| CN | 105188932 A | 12/2015 |
| CN | 106999935 A | 8/2017 |
| CN | 107110854 A | 8/2017 |
| CN | 108535383 A | 9/2018 |
| DE | 37145 | 4/1961 |
| DE | 198 08 063 A1 | 10/1998 |
| DE | 10 2004 021 821 B3 | 12/2005 |
| DE | 10 2009 055 928 A1 | 6/2011 |
| DE | 10 2015 104 531 A1 | 9/2016 |
| EP | 2 401 288 | 9/2010 |
| EP | 2 780 453 B1 | 9/2014 |
| RU | 2 415 676 C1 | 4/2011 |
| WO | 2005/106023 A1 | 11/2005 |
| WO | 2014/117908 A1 | 8/2014 |
| WO | 2016/170345 A1 | 10/2016 |
| WO | 2017/192286 A1 | 11/2017 |
| WO | 2018/165493 A1 | 9/2018 |

OTHER PUBLICATIONS

Yang J. et al., "Microfluidic Pool Structure for Cell Docking and Solution Mixing," Chinese Journal of Sensors and Actuators, Mar. 2008, pp. 377-380, Issue 3.

Shin Y. et al., "Solid phase nucleic acid extraction technique in a microfluidic chip using a novel non-chaotropic agent: dimethyl adipimidate," Lab on a Chip, Dec. 2014, vol. 14, pp. 359-368, The Royal Society of Chemistry.

Frank et al., "Automated co-culture system for spatiotemporal analysis of cell-to-cell communication," Lab on a Chip, Dec. 2015, vol. 15, pp. 2192-2200, The Royal Society of Chemistry.

International Search Report corresponding to PCT Application No. PCT/EP2018/086162, dated Mar. 19, 2019 (German and English language document) (5 pages).

* cited by examiner

METHOD FOR PROVIDING A SOLUTION OF THE SUBSTANCE IN A MICROFLUIDIC DEVICE

This application is a 35 U.S.C. § 371 National Stage Application of PCT/EP2018/086162, filed on Dec. 20, 2018, which claims the benefit of priority to Serial No. DE 10 2018 200 520.6, filed on Jan. 15, 2018 in Germany, the disclosures of which are incorporated herein by reference in their entirety.

BACKGROUND

Microfluidic systems allow the analysis of small sample quantities with a high level of sensitivity. At the same time, automation, miniaturization and parallelization of methods allow a reduction of manual steps and can therefore contribute to avoiding errors. Moreover, miniaturization by microfluidic systems makes it possible to carry out laboratory processes directly with the sample, meaning that there is no need for a general laboratory environment. Instead, a process can be reduced to a fluidic chip. Therefore, microfluidic applications can also be referred to as "lab-on-chip". This field of use of microfluidics is also referred to as "point-of-care (PoC)".

A challenge in the case of PoC systems is especially the storing and the supplying of the chemicals to be used.

SUMMARY

What is presented here is a particularly advantageous method for providing a solution of substance in a microfluidic device. The disclosure also specifies particularly advantageous further developments of the method.

The term "microfluidic" refers here especially to the scale of the microfluidic device. The microfluidic device is characterized in that physical phenomena generally classified under microtechnology are relevant in the fluidic channels and chambers arranged therein. These include, for example, capillary effects, effects (especially mechanical effects) associated with surface tensions of the fluid. These additionally include effects such as thermophoresis and electrophoresis. In microfluidics, said phenomena are usually dominant over effects such as gravity. The microfluidic device can also be characterized in that it is produced at least in part using a layer-by-layer method and channels are arranged between layers of the layer structure. The term "microfluidic" can also be characterized via the cross-sections within the device that serve for guiding the fluid. For example, cross-sections are usually in the range from 100 µm [micrometers]×100 µm right up to 800 µm×800 µm.

By means of the described method, the solution of substance can be provided especially in such a manner in the microfluidic device.

Solvents are often inexpensive and can be kept available in liquid form and stored at room temperature even in relatively large quantities of, for example, more than one milliliter. By contrast, sensitive reagents such as enzymes, nucleic acids or catalysts are often expensive and require more complicated pre-storage methods. To reduce the quantity used of these key components, they are preferably initially charged as lyophilisate. The term lyophilisate describes a state or form of a substance that is present after freeze-drying of the substance. This solid form of the substance can, for example, be pre-stored in microfluidic channels of the microfluidic device. From a lyophilisate of a substance that is kept available in this way, it is possible by means of the described method to provide a solution of the substance in a desired quantity and with a desired concentration. Compared with the soluble form of a substance, lyophilisates can be stored particularly easily even at room temperature.

The microfluidic device can be especially a so-called "lab on a chip" or a "point-of-care" system (PoC). Such a "lab on a chip" is intended and configured for carrying out biochemical processes. This means that functionalities of a macroscopic laboratory are integrated into a plastic substrate for example. The microfluidic device can, for example, comprise channels, reaction chambers, pre-stored reagents, valves, pumps and/or actuation, detection and control units. The microfluidic device can make it possible to process biochemical processes in a fully automatic manner. This means that it is, for example, possible to carry out assays on liquid samples. Such assays can, for example, be used in medicine. The microfluidic device can also be referred to as a microfluidic cartridge. Especially by inputting samples into the microfluidic device is it possible to carry out biochemical processes in the microfluidic device. At the same time, it is also possible for additional substances which trigger, quicken and/or allow biochemical reactions to be admixed with the samples.

The lyophilisate can especially be water-soluble. The lyophilisate is therefore preferably pre-stored in an absolutely dry state. When the lyophilisate comes into contact with an aqueous solution, the lyophilisate can dissolve. In a microfluidic network, this can, for example, mean that, in the case of a chamber and/or in the case of channels into which the solution of the substance is to be introduced, no prewetting takes place before the introduction of the solution of the substance. However, prewetting is desired insofar as a prewetted microfluidic volume can be filled completely without any bubbles. This is especially because prewetting of a surface can make the material of the surface more accessible for a liquid. In addition, air can already be displaced from a channel or from a chamber by prewetting.

Channels and chambers, the surfaces of which are not prewetted, can cause bubbles which can be taken along in a sequential fluid procedure. If a certain concentration of the solution of the substance is to be obtained, a certain quantity of the lyophilisate must be dissolved in a certain quantity of a solvent. Bubbles in a volume can, then, lead to inaccuracies. If prewetting and/or air displacement does not take place, what can thus occur are inaccuracies especially in the concentration of the solution of the substance.

To avoid an undesired dissolution of the lyophilisate and hence especially to avoid bubble formation, the lyophilisate is preferably pre-stored such that the lyophilisate does not come into contact with substances such as water, in which the lyophilisate can be dissolved. Especially for this reason, a dispersion composed of a first medium and a lyophilisate of the substance is provided in step a) of the described method. The lyophilisate is not dissolvable in the first medium.

The first medium is preferably a nonpolar solvent. For instance, the first medium can be especially oil or an organic solvent. The first medium preferably does not comprise water.

A dispersion is to be understood to mean a mixture of at least two substances which do not dissolve in one another or hardly dissolve in one another. In the present case, what is concerned is a dispersion of a solid lyophilisate in the first medium, the lyophilisate not being dissolved in the first medium. At the same time, the lyophilisate can, for example, be present as a lyophilisate body which is surrounded (preferably completely, i.e., toward all sides) by the first medium. The first medium can thus protect the lyophilisate from contact with other substances, especially with water.

From the dispersion composed of the lyophilisate and the first medium that is pre-stored in the microfluidic device, it is possible to obtain the solution of the substance by phase extraction when said solution is required. This means that step a) can continue especially for the duration of a storage of the microfluidic device. When the solution of the substance is required in the microfluidic device, said solution can be obtained from the dispersion especially as per steps b) to d).

In step b) of the described method, a second medium is added to the dispersion obtained as per step a). The lyophilisate is dissolvable in the second medium.

The second medium is preferably a polar solvent. For instance, the second medium can be especially water. The second medium is the solvent in which the substance has been dissolved in the solution of the substance. It is especially possible that the second medium comprises a sample of a substance to be tested. For example, a liquid sample to be tested can be part of the second medium.

In step c) of the described method, the lyophilisate is dissolved in the second medium, with the result that the solution of the substance in the second medium is obtained.

So that the lyophilisate can be dissolved in the second medium, the lyophilisate must come into contact with the second medium. This can, for example, be achieved by mixing the dispersion composed of the lyophilisate and the first medium with the second medium. To this end, the microfluidic device can, for example, be moved, especially shaken. Depending on the densities of the lyophilisate, the first medium and the second medium, it is also possible that the lyophilisate comes into contact with the second medium owing to gravity and is thus dissolved in the second medium. If, for example, the density of the second medium and the density of the lyophilisate are greater than the density of the first medium, the second medium will be arranged below the first medium owing to gravity and the lyophilisate will move downward into the second medium from the dispersion containing the first medium owing to gravity. If, for example, the density of the second medium and the density of the lyophilisate are lower than the density of the first medium, the second medium will be arranged above the first medium owing to gravity and the lyophilisate will move upward into the second medium from the dispersion containing the first medium owing to gravity.

In step d) of the described method, the solution obtained as per step c) is separated from the first medium.

Step d) can especially be referred to as a phase extraction. In particular, a mixture of the first medium and the solution of the substance in the second medium can be present after step c). It is preferred that the first medium and the second medium, or the solution of the substance in the second medium, have different densities. For instance, a separation of the mixture of the first medium and the solution of the substance in the second medium into two phases can be obtained by mere waiting. The first medium is, then, present as a first phase and the solution of the substance in the second medium as a second phase. Depending on the density of the first medium and the second medium, or the solution of the substance in the second medium, either the first phase is present above the second phase or the second phase is present above the first phase. The phases can, for example, be separated by decanting the top phase by tipping the microfluidic device and/or by pumping out one of the phases.

In a preferred embodiment of the method, the second medium is mixed with the dispersion composed of the lyophilisate and the first medium in step c) such that an emulsion in which the lyophilisate is dissolved by the second medium is formed. The emulsion is broken up after the lyophilisate has been dissolved in the second medium.

An emulsion is a finely distributed mixture of immiscible substances which can be present especially in a liquid state. In the present case, an emulsion composed of the second medium and the dispersion of the first medium containing the lyophilisate is formed. An emulsion can be obtained especially by two immiscible liquids being finely distributed in one another, for example by shaking, such that a differentiation between the two liquids (especially as two visibly distinguishable phases) is not possible even though the liquids do not dissolve in one another. The formation of an emulsion is a physical process. The formation of a solution by contrast is a chemical process in which chemical bonds between molecules or atoms are changed.

In the described method, the formation of an emulsion has the advantage that the second medium is distributed in the first medium, or in the dispersion composed of the first medium containing the lyophilisate, such that the second medium comes into contact with the lyophilisate. Thus, the lyophilisate can be dissolved by the second medium. After the lyophilisate has been dissolved, an emulsion composed of the first medium and the solution of the substance in the second medium is present.

After the lyophilisate has been completely dissolved, the first medium can be removed from the solution of the substance in the second medium. To this end, the emulsion is first broken up. This is still done as part of step c). The emulsion can especially be broken up by waiting by utilization of gravity. After the first medium and the solution of the substance in the second medium have separated from one another at least to the extent that two different phases are visible, the separation of the solution from the first medium can be carried out as per step d). This too can be achieved by waiting owing to gravity. In this respect, the transition between the break-up of the emulsion and the separation of the phases, i.e., between step c) and step d), can be gradual.

In this embodiment, a lyophilisate is initially present in a dispersion containing the first medium after step a). Said dispersion is then converted into an emulsion by steps b) and c). At the same time, the lyophilisate is dissolved in the second medium. The two phases thus obtained are then separated by phase extraction in step d). The substance can then be present as a solution in the second medium in a desired quantity and with a desired concentration.

In a further preferred embodiment of the method, the microfluidic device is oriented during the break-up of the emulsion in step c) such that a bottom side of a chamber in which the emulsion is present is tilted with respect to a horizontal plane.

In step c), the emulsion can be obtained especially in a chamber of the microfluidic device. To separate the emulsion, gravity can be utilized in particular. In this case, the heavier fractions of the emulsion move downward and the lighter fractions move upward. The lower an extent of the emulsion in the direction of gravity, the smaller the path to be traveled in this case by the constituents of the emulsion for separation of the emulsion. By tilting the chamber or the entire microfluidic device from the horizontal plane, it is possible to reduce the extent of the emulsion in the direction of gravity at least for a portion of the emulsion. In addition, the surface of the emulsion can be increased by tilting. This too can contribute to breaking up the emulsion more rapidly.

Preferably, the microfluidic device is tilted by an angle in the range from 5° to 60°, especially in the range from 20° to 40°, with respect to the horizontal plane.

In a further preferred embodiment of the method, the emulsion is formed by the second medium and the dispersion composed of the lyophilisate and the first medium being shifted together repeatedly between at least two mixing chambers of the microfluidic device.

Preferably, exactly two mixing chambers are used. The at least two mixing chambers are preferably connected to one another by a connecting channel. A flow path between the two mixing chambers preferably has, at least at one site, a constriction. This can be especially realized by the connecting channel having a smaller cross-section than one mixing chamber or both mixing chambers. Thus, shifting of the emulsion to be formed (i.e., of the second medium and of the dispersion composed of the first medium containing the lyophilisate) between the mixing chambers leads to turbulences in the flow of the emulsion to be formed. Such turbulences can allow a particularly fine distribution of the constituents of the emulsion to be formed (i.e., of the second medium and of the dispersion of the first medium containing the lyophilisate).

The emulsion to be formed can especially be moved back and forth between the mixing chambers by pumping. A pressure required thereof can, for example, be achieved by a compression of a flexible chamber and/or by a mechanical and/or electric pump.

In a further preferred embodiment of the method, a temperature of the second medium and/or of the dispersion composed of the lyophilisate and the first medium is increased to form the emulsion.

A high temperature can contribute to the second medium distributing particularly finely and particularly rapidly in the first medium, or in the dispersion composed of the first medium containing the lyophilisate. Preferably, the temperature is increased to a value in the range between 50° C. and 90° C., especially in the range between 60° C. and 75° C., to form the emulsion. The temperature to be chosen can depend especially on the lyophilisate, but also on the first medium and/or on the second medium.

In a further preferred embodiment of the method, a temperature of the emulsion is lowered to break up the emulsion.

A low temperature can contribute to the second medium distributing particularly poorly in the first medium, or in the dispersion composed of the first medium containing the lyophilisate. Preferably, the temperature is lowered to a value in the range between 0° C. and 30° C., especially in the range between 5° C. and 10° C., to break up the emulsion. The temperature to be chosen can especially depend on the lyophilisate, but also on the first medium and/or on the second medium.

In a further preferred embodiment of the method, the lyophilisate is kept available in a reservoir chamber of the microfluidic device, wherein the dispersion is provided as per step a) by addition of the first medium to the reservoir chamber.

The dispersion composed of the lyophilisate and the first medium can especially be provided in step a) of the described method by an already prepared dispersion being introduced into the microfluidic device or already being kept available in the microfluidic device. For instance, a microfluidic device as delivered can, in particular, already contain the dispersion.

As an alternative to providing a prepared dispersion, providing the dispersion in the present embodiment comprises creating the dispersion. To this end, the lyophilisate and the first medium are mixed.

In a further preferred embodiment of the method, the lyophilisate is moved at least temporarily by a flow of the first medium within the microfluidic device.

The lyophilisate can especially be kept available at a site of the microfluidic device other than at which the substance or the solution thereof is to be used. As a result of a flow of the first medium, the lyophilisate can be moved particularly easily between different sites of the microfluidic device. By means of the first medium, the lyophilisate can, at the same time, be protected from other substances.

The flow of the first medium can, for example, be set by introducing the first medium into the microfluidic device at one or more inlets. In addition, the first medium can be kept available in the microfluidic device, with a flow of the first medium being produced by compression of a flexible chamber and/or by a mechanical and/or electric pump. Preferably, the microfluidic device comprises valves, via which the flow of the first medium can be directed.

In a further preferred embodiment of the method, the lyophilisate is moved by a flow of the first medium to a constriction site of a line of the microfluidic device and held there at least temporarily.

In this embodiment, the lyophilisate can especially be held at a certain position. This can, for example, be advantageous for temporarily storing the lyophilisate between two process steps and/or for holding the lyophilisate ready for use in a process. The constriction site is preferably designed such that the lyophilisate cannot pass said site. For example, an outlet from a chamber in which the lyophilisate is situated can have a sufficiently small cross-section for the lyophilisate to be unable to leave the chamber through the outlet. With a flow leaving the chamber through the outlet, the lyophilisate is, however, moved up to the constriction site, with the result that the position of the lyophilisate is fixed immediately upstream of the constriction site.

At the constriction site, a flow path preferably has a cross-section which is dimensioned and designed such that the lyophilisate cannot pass the constriction site. Also possible as a constriction site is, for example, a grid in which even the largest opening has a cross-section which is too small for the lyophilisate.

In a further preferred embodiment of the method, the lyophilisate is provided in step a) as a plurality of lyophilisate bodies, wherein the lyophilisate bodies are moved at least temporarily in succession or at the same time by setting a respective flow of the first medium within the microfluidic device.

The microfluidic device can comprise a multiplicity of chambers and channels. For example, lyophilisate bodies of identical or different substances can be kept available in multiple chambers. Depending on the process to be carried out, it may, at the same time, be desirable to use one or more of these substances in one process chamber for example. To this end, by setting a flow of the first medium, it is, for example, possible to move one or more of the lyophilisate bodies into a mixing chamber, in which the solution of the substance can be obtained as per the described method.

As a further aspect, what is presented is the use of a lyophilisate of a substance for providing a solution of the substance in a microfluidic device.

The particular advantages and design features of the method that are described further above are applicable and transferable to the described use.

By means of the described method, especially a lyophilisate in a dispersion can be stored, be used for wetting surfaces of the microfluidic device and/or be transported through the microfluidic device. Furthermore, the lyophilisate can be dissolved in an aqueous phase by phase extraction. In this connection, the lyophilisate can be admixed as a compacted solid ("bead") with an organic phase (the first medium; preferably an oil). The organic phase does not dissolve the bead. A further, aqueous phase (the second medium) can dissolve the bead to form an emulsion.

The lyobead (i.e., the lyophilisate) is not dissolved in the organic phase (the first medium). As a result, a chamber in which the lyobead is pre-stored has been fluidically activated. Depending on the oil used, it is possible, then, for surfaces of the microfluidic device to be wetted and/or air to be displaced from chambers and lines.

A lyobead can be moved in a microfluidic network by means of the organic phase (the first medium) and change position. Whether the lyobead is transported or remains on the spot can especially be controlled by the geometry of the channels. The transport of the lyobeads can especially also allow a connection of multiple lyobeads in series (i.e., the use of multiple lyobeads in succession). This can especially also allow a series connection of multiple PCR reactions (i.e., polymerase chain reactions), and this in turn can allow a higher degree of multiplexing.

It is possible to choose an organic phase (i.e., a first medium) having a higher gas solubility than the aqueous phase (i.e., the second medium). In this case, any gases arising in the dissolution process can be removed by the organic phase (the first medium) and also be separated via phase separation.

When a lyophilisate is used as an aqueous phase, lipophilic components which can, for example, interfere with a subsequent PCR can be removed through the organic phase (the first medium) by phase extraction.

Salts present in the lyobead can make a positive contribution to renewed phase separation after emulsification, without the phase separation having to be forced with additional demulsifiers.

Properties prevailing in a microfluidic device, such as, for example, a temperature and/or an inclination of the microfluidic device and also differences in the density of the phases (of the first medium and the second medium), can promote emulsion formation and/or demulsification. For instance, an emulsion can be promoted by a high temperature. By contrast, cooling can promote a phase separation. If the microfluidic device is inclined, the lighter phase can rise to the top particularly rapidly.

The microfluidic device preferably comprises a one-way flow system which allows especially a so-called point-of-care diagnosis. Constituents of the microfluidic device can, in this case, be made in a polycarbonate injection-molded part. For sequential dissolution, a valve switching option is preferably envisaged. The lyophilisate used should be water-soluble and preferably inert in relation to oils. As aqueous solution, water admixed with classic attributes such as Tween, Triton-X, calcium can be used. These are preferably compatible in relation to the lyobead. As possible oils, inert mineral oils, silicone oils or fluorinated oils can be used.

BRIEF DESCRIPTION OF THE DRAWINGS

Further details of the disclosure and an exemplary embodiment, to which the disclosure is not restricted however, will be more particularly elucidated on the basis of the drawings, where.

DETAILED DESCRIPTION

Figure 1:
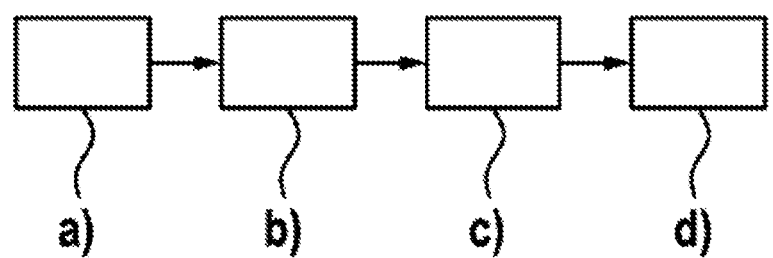
FIG. 1: shows a representation of a method for providing a solution of a substance in a microfluidic device.

FIG. 1 shows a first schematic representation of a method for providing a solution 7 of a substance in a microfluidic device 1. The reference signs relate to the following Figs. The method comprises the following method steps:
a) providing a dispersion 5 composed of a first medium 3 and a lyophilisate 2 of the substance, wherein the lyophilisate 2 is not dissolvable in the first medium 3,
b) adding a second medium 4 to the dispersion 5 obtained as per step a), wherein the lyophilisate 2 is dissolvable in the second medium 4,
c) dissolving the lyophilisate 2 in the second medium 4, with the result that the solution 7 of the substance in the second medium 4 is obtained,
d) separating the solution 7 obtained as per step c) from the first medium 3.

Figure 2A:
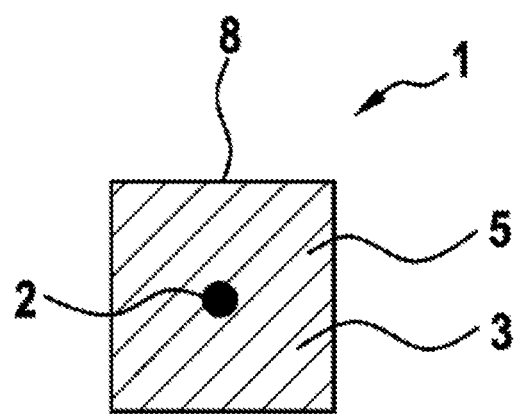
FIGS. 2a to 2d: show representations of the method for providing a solution of a substance in a microfluidic device from FIG. 1, FIGS. 3a to 3c: show representations of part of the method from FIGS. 1 and 2, in which the lyophilisate is moved through the microfluidic device.
Figure 2B:
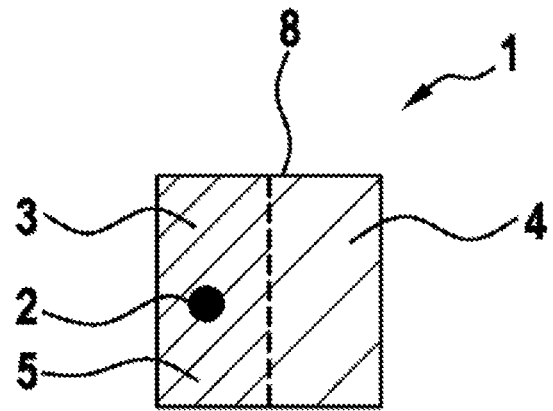
Figure 2C:
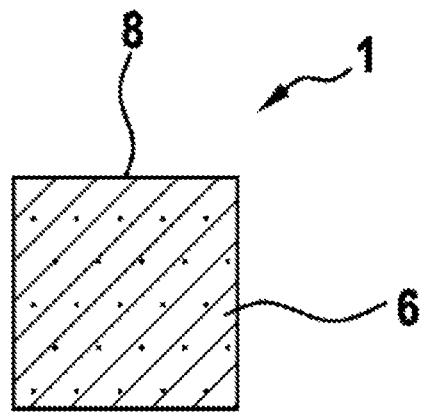
Figure 2D:
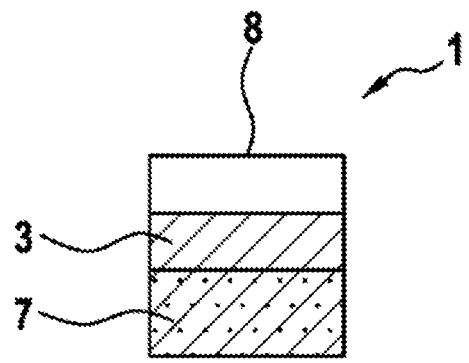

FIGS. 2a to 2d show representations of the method from FIG. 1. What is shown here is a microfluidic device 1. Pre-stored in a chamber 8 of the microfluidic device 1 is a lyophilisate 2 as a lyobead in a first medium 3 such as, for example, oil (FIG. 2a). A dispersion 5 composed of the first medium 3 and the lyophilisate 2 is therefore present. A second medium 4 such as, for example, an aqueous phase is fed into the chamber 8 (FIG. 2b). The two phases are then mixed and an emulsion 6 is produced at the same time (FIG. 2c). This is followed by a phase extraction, the lyophilisate 2 (i.e., the bead) dissolving in the aqueous phase and passing from the dispersion 5 into a solution 7 (FIG. 2d). The emulsion 6 is subsequently left to stand for break-up of the emulsion 6 and separation of the two phases (i.e., the first medium 3 and the solution 7—like in the case of a separation funnel for example. Gases (e.g., air bubbles) can be removed as their own phase. The demulsification can be controlled or promoted by addition of additives and/or by thermal management. A cooling operation can, for example, bring about a poorer mixing of the two phases and hence a better separation.

Figure 3A:
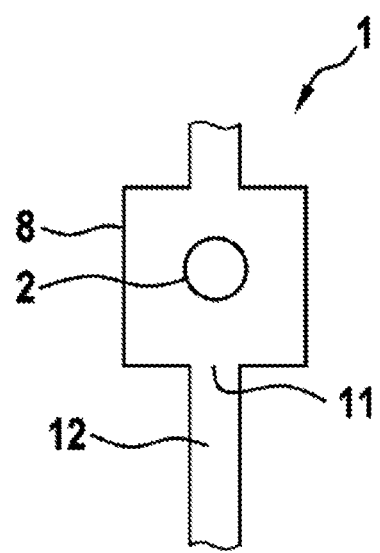
Figure 3B:
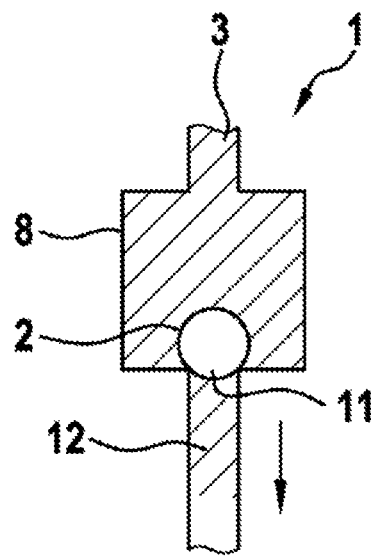
Figure 3C:
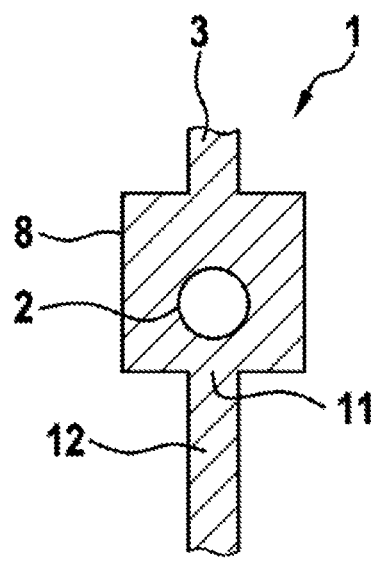

FIGS. 3a to 3c show representations of part of the method from FIGS. 1 and 2, in which the lyophilisate 2 is moved through the microfluidic device 1. What is shown here is that the lyophilisate 2 as a lyobead is pre-stored in a dry state in a chamber 8 which is part of a line 12 (FIG. 3a). When the chamber 8 is filled with oil as a first medium 3, the lyophilisate 2 is held back at a constriction site 11 of the line 12 owing to the geometry and air is displaced from the chamber 8 by the oil (FIG. 3*b*). Thus, the chamber 8 can be fluidically activated with an organic phase which is inert in relation to the lyobead. If no such flow of the first medium 3 is present, the lyophilisate 2 can also, for example, be situated in the middle of the chamber 8 (FIG. 3*c*).

Figure 4A:
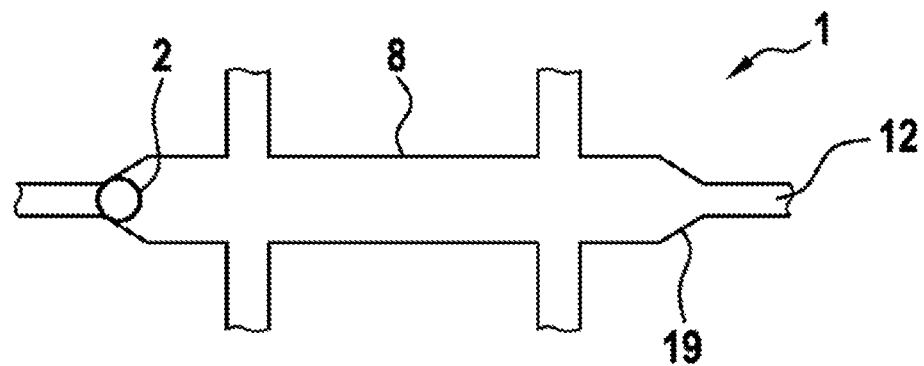
FIGS. 4a to 4d: show representations of part of the method from FIGS. 1 and 2, in which the lyophilisate is moved through the microfluidic device
Figure 4B:
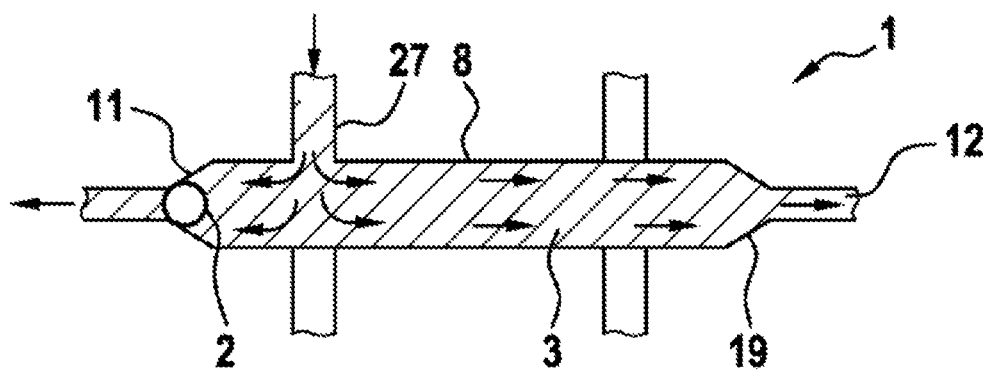
Figure 4C:
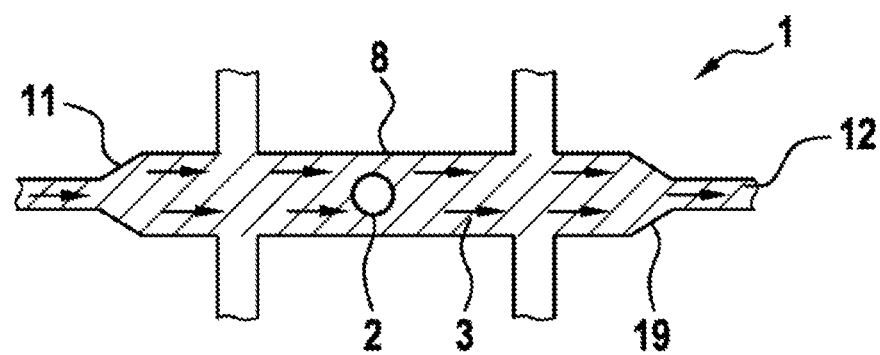
Figure 4D:
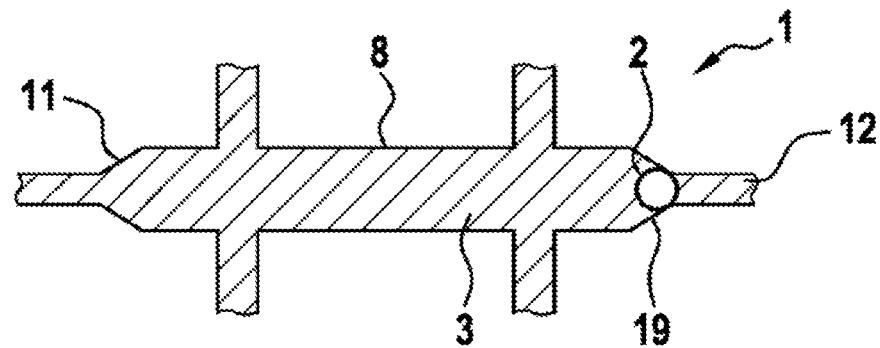

FIGS. 4*a* to 4*d* show representations of part of the method from FIGS. 1 and 2, in which the lyophilisate 2 is moved through the microfluidic device 1. What is demonstrated thereby is how a lyophilisate 2 present as a lyobead can be brought into a dispersion 5 and can be transported to another site of the microfluidic device 1 by means of flow. The lyophilisate 2 is, then, initially present at the left edge of a chamber 8 in a line 12 which has two funnel-shaped constriction sites 11, 19 (FIG. 4*a*). The first medium 3 is subsequently filled into the chamber 8 through an inlet 27. The lyophilisate 2 remains static in the course of this, since it is held back by a first constriction site 11 having funnel geometry (FIG. 4*b*). Now, when the flow direction of the first medium 3 (i.e., the oil) is reversed, the lyophilisate 2 is transported along with the first medium 3, since it is no longer halted by the chamber geometry (FIG. 4*c*). When the lyophilisate 2 arrives at a second constriction site 19 on the right edge of the chamber 8, the lyophilisate 2 is reimmobilized and thus has a new location (FIG. 4*d*).

Figure 5A:
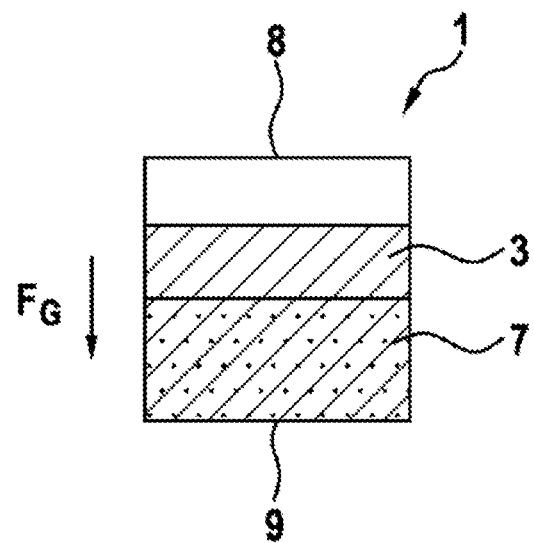
FIGS. 5a and 5b: show representations of part of the method from FIGS. 1 and 2, in which an emulsion is broken up.
Figure 5B:
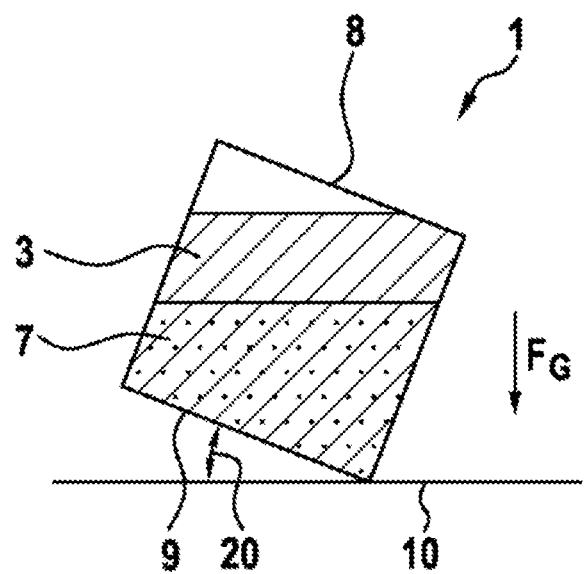

FIGS. 5*a* and 5*b* show representations of part of the method from FIGS. 1 and 2, in which an emulsion 6 is broken up. What is shown here is that gravitational force can be utilized for a two-phase system composed of the first medium 3 and the solution 7. Gravity helps to separate the phases from one another. The phase with lower density will, at equilibrium, be layered above the phase with the higher density. This favors the removal of the two phases after demulsification, since they will be present as individual phases. The entire gravitational force need not necessarily act as shown in FIG. 5*a*. An inclination of the entire system (e.g., by 30°, meaning that only half of the gravitational force FG acts) supports the process, too (FIG. 5*b*). Drawn in for this purpose is an angle 20, which indicates how far a bottom side 9 of the chamber 8 is tilted with respect to a horizontal plane 10.

Figure 6A:
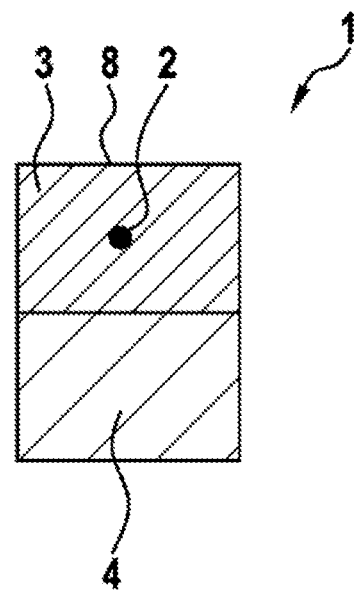
FIGS. 6a to 6d: show representations of part of the method from FIGS. 1 and 2, in which the lyophilisate is dissolved in the second medium.
Figure 6B:
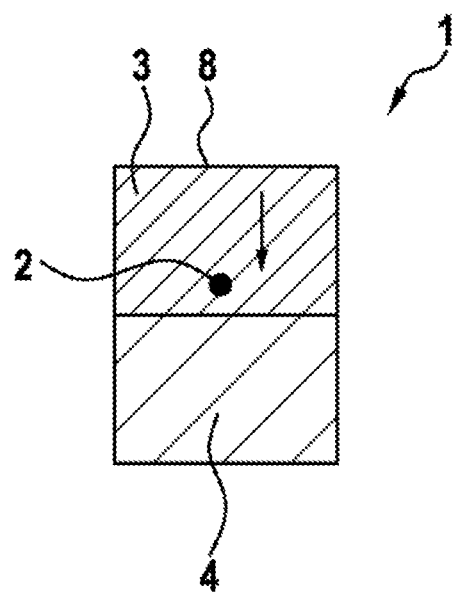
Figure 6C:
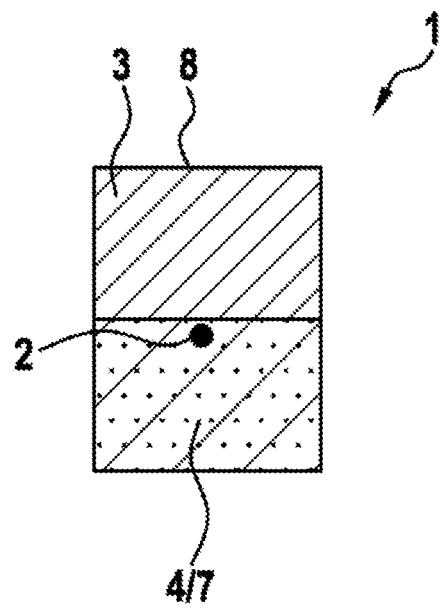
Figure 6D:
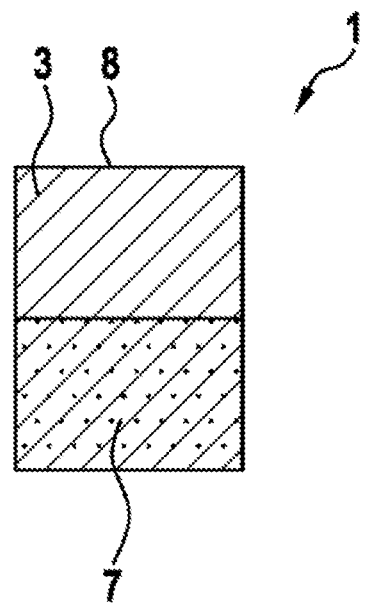

FIGS. 6*a* to 6*d* show representations of part of the method from FIGS. 1 and 2, in which the lyophilisate 2 is dissolved in the second medium 4. What is shown to this end is how gravitational force can be utilized for dissolving a lyophilisate 2 present as a lyobead. If the density of the lyophilisate 2 is greater than that of the first medium 3 (i.e., for example the oil), the lyophilisate 2 will move downward (FIG. 6*a* via FIG. 6*b* to FIG. 6*c*). If the heavier second medium 4 (i.e., for example the aqueous phase) is situated below the first medium 3, the lyophilisate 2 is directly dissolved at the interface between the two phases, with the result that the solution 7 is obtained (FIG. 6*c* to FIG. 6*d*). In this connection, what is indicated by the reference sign "4/7" in FIG. 6*c* is that some of the lyophilisate 2 is already dissolved in the second medium 4, meaning that the second medium 4 is already partially present as a solution 7. No emulsion is formed in this embodiment.

The system also works in the reverse case when the oil is heavier and the lyobead rises and is dissolved at the interface above in the aqueous phase.

Figure 7A:
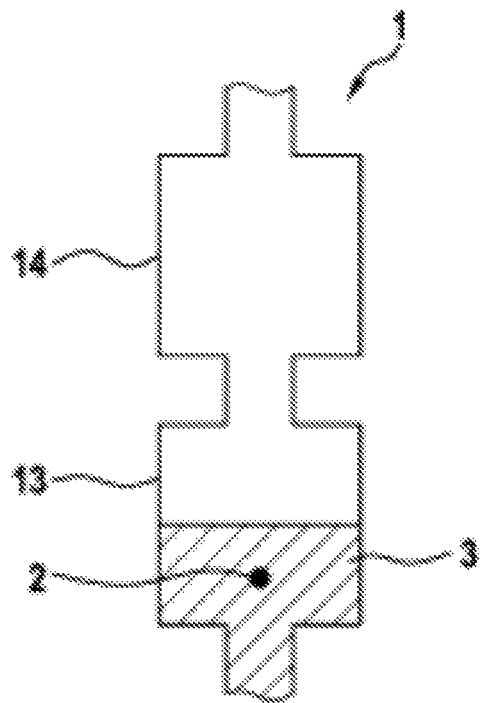
FIGS. 7a to 7d: show representations of part of the method from FIGS. 1 and 2, in which the emulsion is formed and broken up.
Figure 7B:
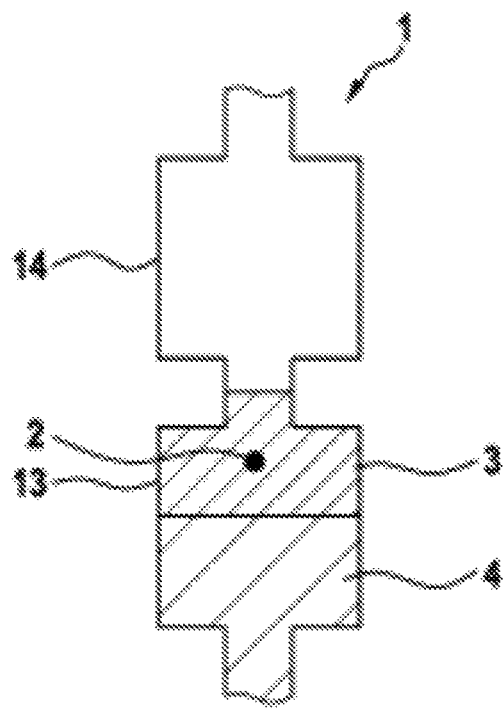
Figure 7C:
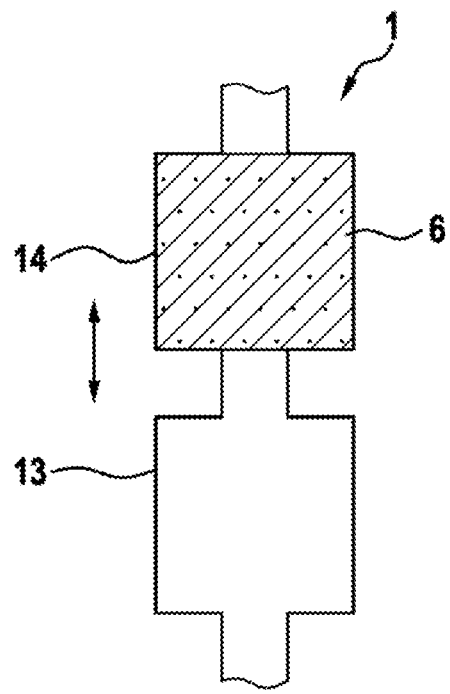
Figure 7D:
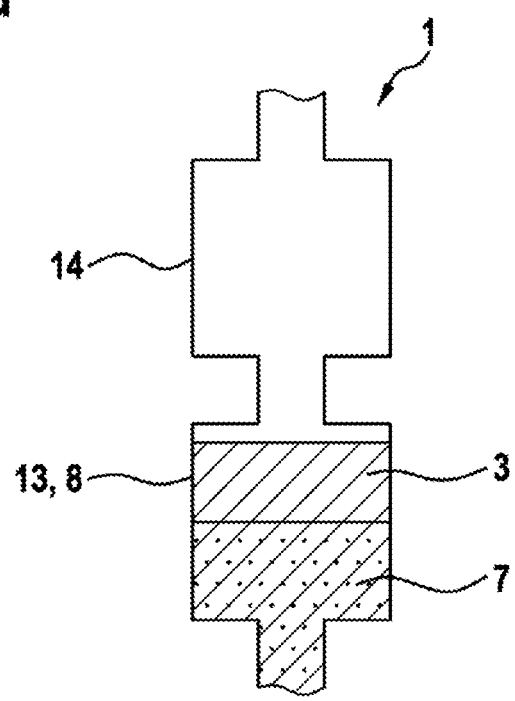

FIGS. 7*a* to 7*d* show representations of part of the method from FIGS. 1 and 2, in which the emulsion 6 is formed and broken up. What is shown here is how a lyophilisate 2 present in the dispersion 5 as a lyobead can be mechanically distributed in the second medium 4 and hence in a different phase. In this connection, the lyobead is pre-stored in a first mixing chamber 13 or transported into said chamber (FIG. 7*a*). The first mixing chamber 13 is either half-filled with the second medium 4 or constructed such that it can be supplemented with the second medium 4 by flow (FIG. 7*b*). This two-phase system with lyobead in oil (as dispersion 5 of the first medium containing the lyophilisate 2) and, ideally, sample material in the second medium 4 is distributed in one another by rapid back-and-forth movement between the first mixing chamber 13 and a second mixing chamber 14 (FIG. 7*c*). This oscillating movement imitates a shaking action, the result being an emulsion 6. In the emulsion 6, the lyophilisate 2 dissolves in the second medium 4 and is therefore extracted from the first medium 3. The emulsion 6 is then left to stand to start a phase separation, by means of which the solution 7 is separated from the first medium 3 (FIG. 7*d*). To produce an optimal phase separation, the microfluidic device 1 can be tipped as shown in FIG. 5*b*, with the result that gravity has an appropriate influence on the separation of the phases. The two phases can subsequently be fluidically separated by pumping. In addition, a higher temperature can additionally be set in the emulsion step, so that the two phases mix better. In the phase separation, the temperature can be brought back down (especially by cooling), the result of this being that the solubility of the two phases additionally decreases.

Figure 8A:
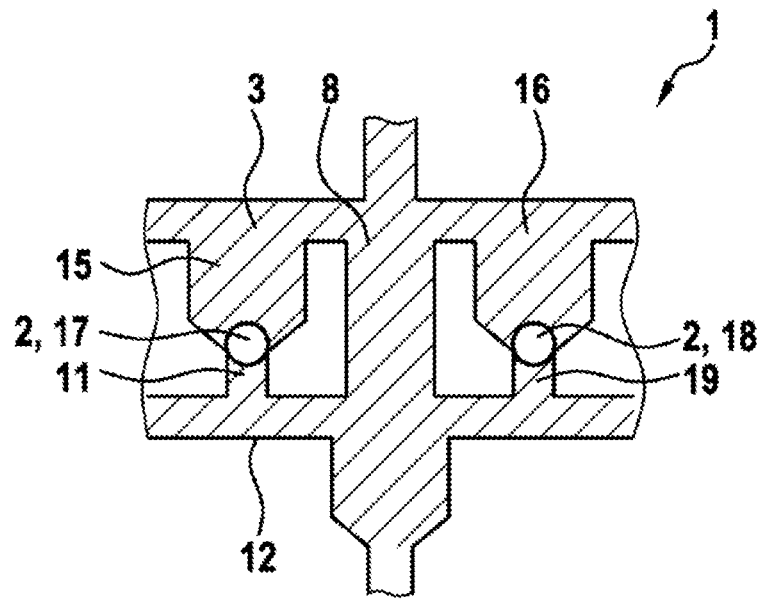
FIGS. 8a to 8f: show representations of part of the method from FIGS. 1 and 2, in which two lyophilisate bodies are moved through the microfluidic device.
Figure 8B:
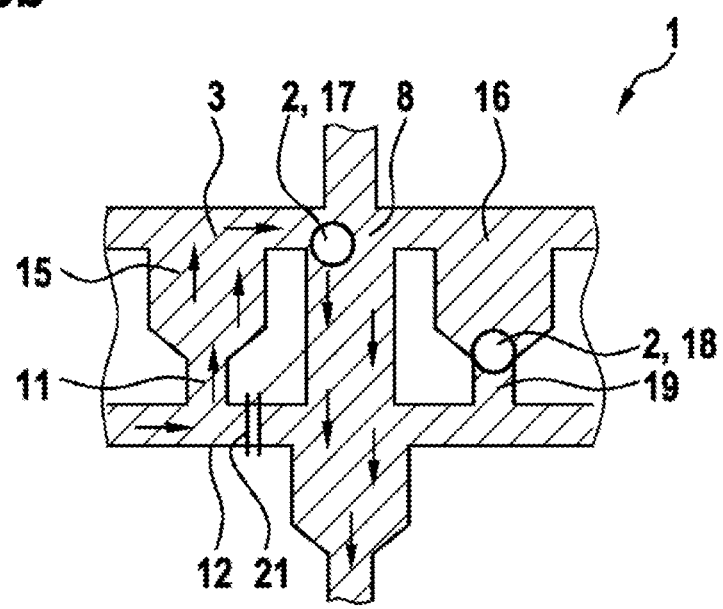
Figure 8C:
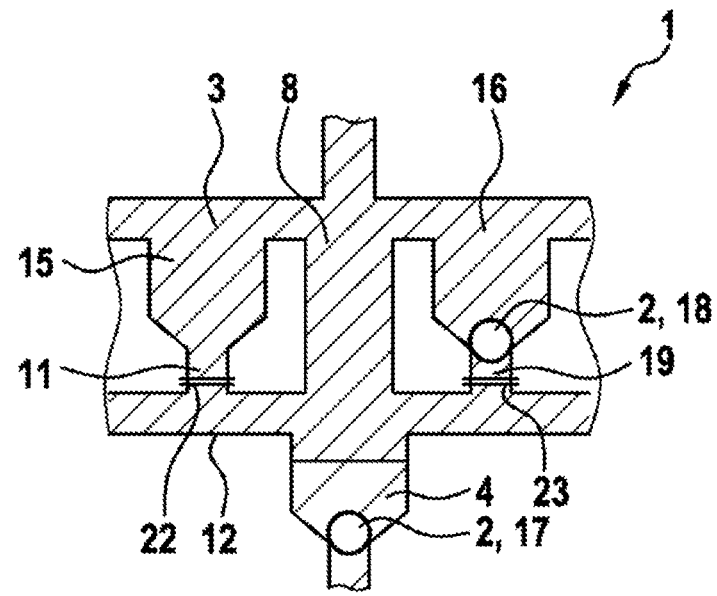
Figure 8D:
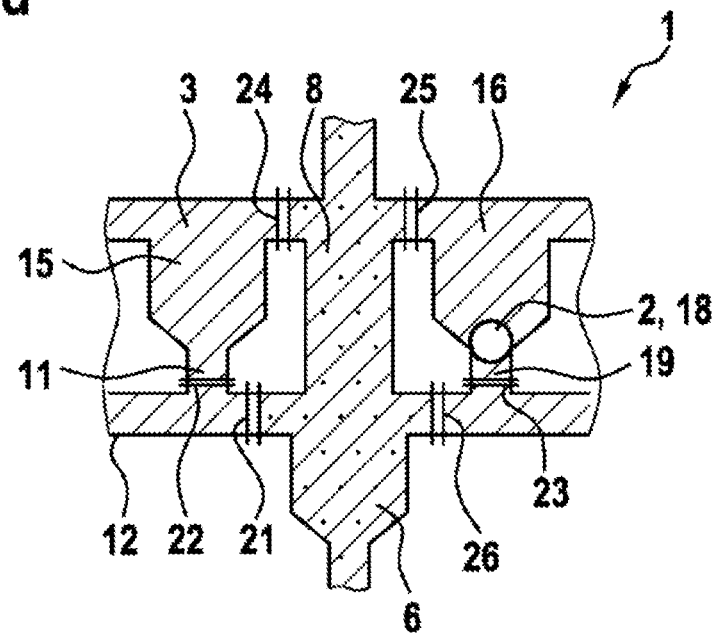
Figure 8E:
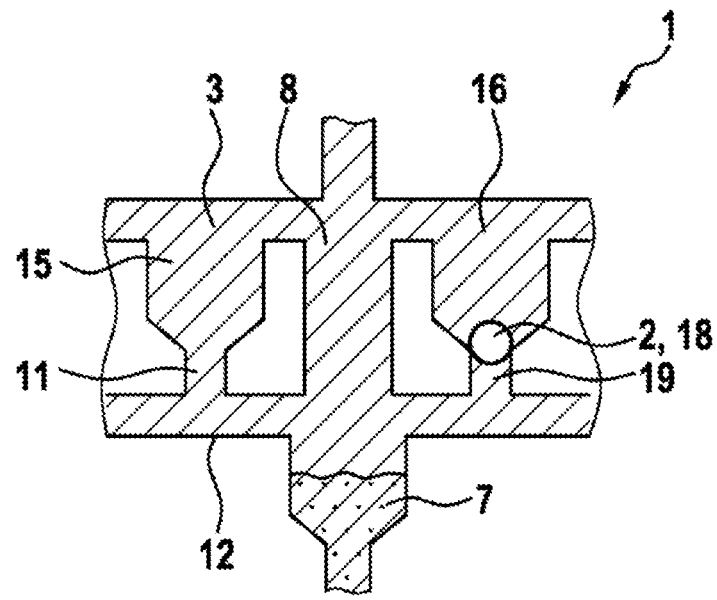
Figure 8F:
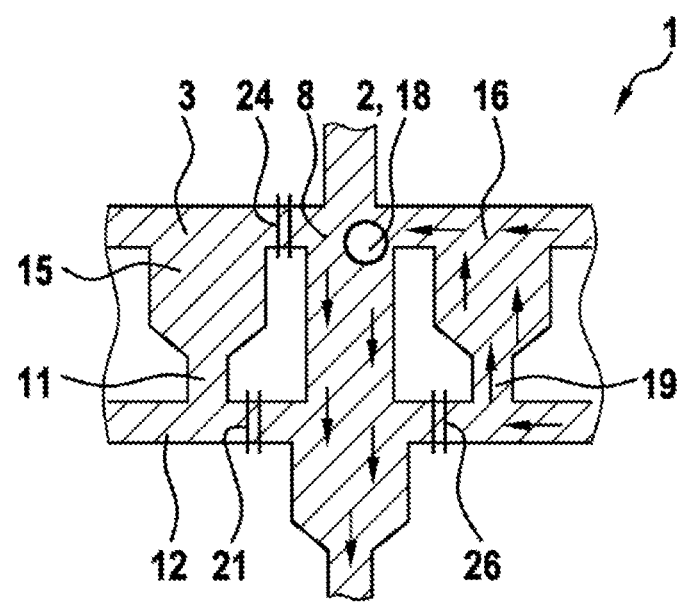

FIGS. 8*a* to 8*f* show representations of part of the method from FIGS. 1 and 2, in which two lyophilisate bodies 17, 18 (which are formed using the lyophilisate 2) are moved through the microfluidic device 1. What is demonstrated thereby is a fluidic concept in which the two lyophilisate bodies 17, 18 (which can also be referred to as lyobeads) are dissolved successively. A first lyophilisate body 17 is kept available in a first reservoir chamber 15 of the microfluidic device 1. A second lyophilisate body 18 is kept available in a second reservoir chamber 16 of the microfluidic device 1. The two lyophilisate bodies 17, 18 are provided in the first medium 3. First of all, the two lyophilisate bodies 17, are held at respective constriction sites 11, 19 of lines 12 (FIG. 8*a*). Proceeding from this, the first medium 3 flows onto the first lyophilisate body 17 by means of suitable valve positions such that the first lyophilisate body 17 is—in accordance with the principle from FIGS. 4*a* to 4*d*—transferred into a free funnel-shaped chamber 8 (FIG. 8*b*). At the same time, a first valve 21 in particular is closed. In FIGS. 8*a* to 8*f*, valves are only drawn in if they are closed. The chamber 8 is overcoated or undercoated with the second medium 4 (FIG. 8*c*). At the same time, the valve positions are preferably chosen such that the second lyophilisate body 18 cannot be dissolved. In particular, a second valve 22 and a third valve 23 are closed. Subsequently, the emulsion 6 is produced (FIG. 8*d*). To this end, the first valve 21, the second valve 22, the third valve 23, a fourth valve 24, a fifth valve 25 and a sixth valve 26 are closed. Thereafter, the phase extraction can take place, the result being that the phases are separated (FIG. 8*e*). The solution 7 can, then, be removed. Thereafter, the second lyophilisate body 18 can be processed analogously to the first lyophilisate body 17 (FIG. 8*f*). It is conceivable to first analytically process the solution 7 obtained from the first lyophilisate body 17 (e.g., with a preamplification of DNA, or with a reverse transcriptase) and to dissolve in the same solution 7 (after possible microfluidic dilutions) the second lyophilisate body 18 with new PCR material.

The invention claimed is:

1. A method for providing a solution of a substance in a microfluidic device, comprising:
   providing a dispersion including a first medium and a lyophilisate of the substance, wherein the lyophilisate is not dissolvable in the first medium;
   adding a second medium to the dispersion, wherein the lyophilisate is dissolvable in the second medium;
   dissolving the lyophilisate in the second medium so as to obtain the solution of the substance in the second medium; and
   separating the solution obtained by the dissolving of the lyophilisate from the first medium.

2. The method as claimed in claim 1, wherein the dissolving of the lyophilisate comprises:
   mixing the second medium with the dispersion of the lyophilisate and the first medium so as to form an emulsion in which the lyophilisate is dissolved by the second medium; and
   breaking up the emulsion after the lyophilisate has been dissolved in the second medium.

3. The method as claimed in claim 2, wherein the breaking up of the emulsion includes orienting the microfluidic device such that a bottom side of a chamber in which the emulsion is present is tilted with respect to a horizontal plane.

4. The method as claimed in claim 2, wherein the mixing of the second medium to form the emulsion comprises repeatedly shifting the second medium and the dispersion composed of the lyophilisate and the first medium together between at least two mixing chambers of the microfluidic device.

5. The method as claimed in claim 2, wherein the mixing of the second medium to form the emulsion comprises increasing a temperature of the second medium and of the dispersion composed of the lyophilisate and the first medium.

6. The method as claimed in claim 2, wherein the breaking up of the emulsion comprises lowering a temperature of the emulsion.

7. The method as claimed in claim 1, wherein the lyophilisate is kept available in a reservoir chamber of the microfluidic device, and the providing of the dispersion includes adding the first medium to the reservoir chamber.

8. The method as claimed in claim 1, wherein the lyophilisate is moved at least temporarily by a flow of the first medium within the microfluidic device.

9. The method as claimed in claim 1, wherein the lyophilisate is moved by a flow of the first medium to a constriction site of a line of the microfluidic device and held at the constriction site at least temporarily.

10. The method as claimed in claim 1, wherein:
    the lyophilisate includes a plurality of lyophilisate bodies, and
    the method further comprises moving the lyophilisate bodies at least temporarily in succession or at the same time by setting a respective flow of the first medium within the microfluidic device.

11. A method comprising:
    using a lyophilisate of a substance to provide a solution of the substance in a microfluidic device.

* * * * *